(12) United States Patent
Majumdar et al.

(10) Patent No.: US 9,250,087 B2
(45) Date of Patent: Feb. 2, 2016

(54) IDENTIFICATION OF MOBILE DEVICE LOCATION

(71) Applicant: International Business Machines Corporation, Armonk, NY (US)

(72) Inventors: Gautam Majumdar, Wappingers Falls, NY (US); Michael Q. Wang, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/190,458

(22) Filed: Feb. 26, 2014

(65) Prior Publication Data

US 2015/0241222 A1 Aug. 27, 2015

(51) Int. Cl.
*G01C 21/00* (2006.01)
*G08B 25/00* (2006.01)
*G01C 21/20* (2006.01)

(52) U.S. Cl.
CPC .............. *G01C 21/206* (2013.01); *G01C 21/00* (2013.01)

(58) Field of Classification Search
CPC . A01B 69/008; G01S 13/885; G06F 19/3431; G06F 19/3443; G06F 19/3493; G06F 17/30241; G06F 11/3062; G06F 8/34; G06F 8/61; G06F 17/30247; G06F 17/30781; G06Q 10/0631; G06Q 50/22; G06Q 10/02; G06Q 10/025; G06Q 10/10; G06Q 10/06; A62B 99/00; G01B 21/04; G06T 15/04; G06T 17/05; H04W 4/02; H04W 4/04; H04L 67/18; H04L 67/04; H04L 67/34; H04L 67/02; H04L 67/2842

USPC ................ 701/495, 485, 482, 516, 517, 520, 701/468–473, 445–454, 32.3; 340/989–994, 426.19, 539.13, 539.32, 340/8.1
See application file for complete search history.

(56) References Cited

U.S. PATENT DOCUMENTS

| | | | |
|---|---|---|---|
| 7,266,378 B2 | 9/2007 | Norta et al. | |
| 7,308,272 B1 | 12/2007 | Wortham | |
| 8,494,554 B2 | 7/2013 | Marti et al. | |
| 8,521,152 B2 | 8/2013 | Hotes et al. | |
| 2009/0280829 A1* | 11/2009 | Feuerstein | 455/456.1 |

(Continued)

FOREIGN PATENT DOCUMENTS

| | | |
|---|---|---|
| WO | 2011034453 A1 | 3/2011 |
| WO | 2011034454 A1 | 3/2011 |

OTHER PUBLICATIONS

Mitra et al.; "WIDGIS A Distributed Approach to GIS Systems and Location-based Service for Internet-enabled Handheld Mobile Devices"; The IET International Conference on: Wireless, Mobile and Multimedia Networks; Jan. 11-12, 2008; Mumbai, India.

*Primary Examiner* — Muhammad Shafi
(74) *Attorney, Agent, or Firm* — Edward J. Wixted, III

(57) ABSTRACT

An approach for identifying a location of a mobile device is provided. In the approach, location information from a mobile device is received, wherein the location information includes a sampling of location coordinates of the mobile device over a period of time. A processor generates a path, using the sampling of location coordinates of the mobile device over the period of time. A processor compares the path to geographic information system (GIS) data associated with the received location information. A processor determines additional location information based on the path and the GIS data.

14 Claims, 4 Drawing Sheets

(56) References Cited

U.S. PATENT DOCUMENTS

| | | | |
|---|---|---|---|
| 2009/0289829 A1* | 11/2009 | Maier | G08C 23/04 341/176 |
| 2011/0065451 A1 | 3/2011 | Danado et al. | |
| 2011/0066646 A1 | 3/2011 | Danado et al. | |
| 2012/0115475 A1* | 5/2012 | Miyake | G06Q 10/06 455/435.1 |
| 2013/0172009 A1* | 7/2013 | Gupta | G01S 5/0252 455/456.1 |
| 2013/0237242 A1 | 9/2013 | Oka et al. | |

* cited by examiner

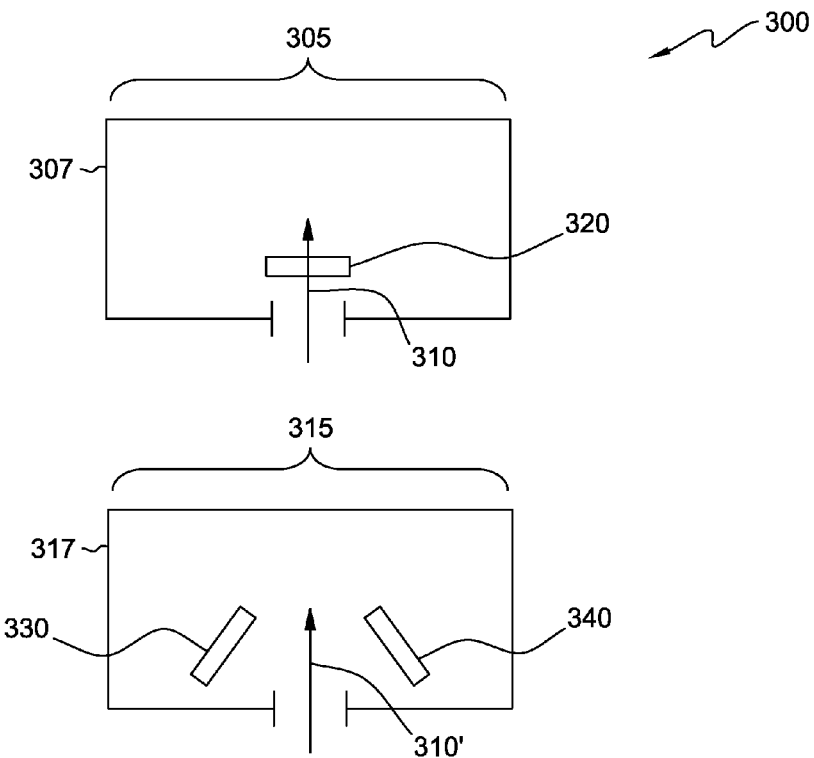
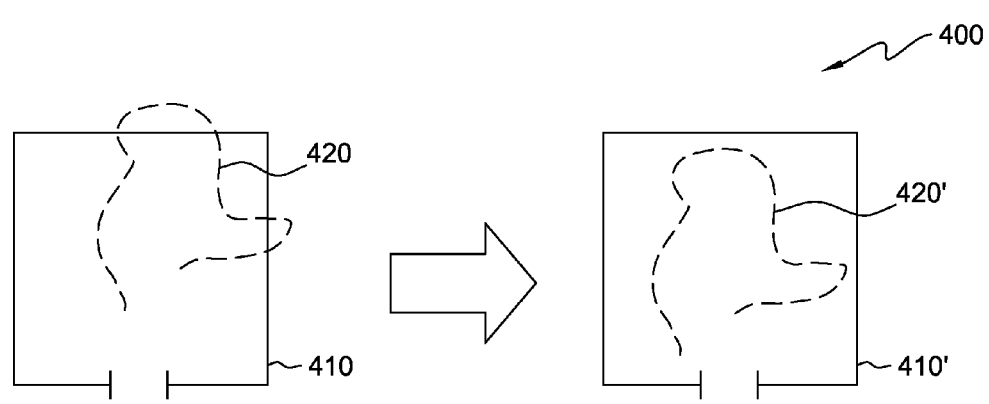
FIG. 3
FIG. 4

IDENTIFICATION OF MOBILE DEVICE LOCATION

TECHNICAL FIELD

The present invention relates generally to the field of mobile device location identification, and more particularly to utilizing geographic information system (GIS) information to enhance location identification.

BACKGROUND

Mobile device location identification may be accomplished through multilateration techniques, e.g., Global Positioning System (GPS). GPS is a satellite-based navigation system made up of a network of satellites placed in orbit. GPS satellites circle the Earth and continually transmit messages to Earth that include the time the message was transmitted and the satellite position at the time of the message transmission. A GPS receiver uses the messages it receives from multiple satellites to determine the transit time of each message to calculate the location of the GPS receiver. Multilateration is a navigation technique based on the measurement of the difference in distance to two or more stations at known locations that broadcast signals at known times. For example, with a mobile phone, location identification may be accomplished through the use of multilateration of radio signals between several radio towers of the network and the phone.

A geographic information system (GIS) is a system designed to capture, store, manipulate, analyze, manage, and present all types of geographical data. In general, GIS describes any information system that integrates, stores, edits, analyzes, shares, and displays geographic information. GIS applications can allow users to create interactive queries, analyze spatial information, edit data in maps, and present the results of these operations. GIS data represents physical objects (such as roads, land use, elevation, trees, waterways, etc.) and this data may be varied based on the design of the GIS and its intended use.

SUMMARY

In one aspect, the present invention provides a method for identifying a location of a mobile device. The method includes receiving location information from a mobile device, wherein the location information includes a sampling of location coordinates of the mobile device over a period of time. The method further includes generating, by one or more processors, a path, using the sampling of location coordinates of the mobile device over the period of time. The method further includes comparing, by one or more processors, the path to geographic information system (GIS) data associated with the received location information. The method further includes determining, by one or more processors, additional location information based on the path and the GIS data.

In another aspect, the present invention provides a computer program product for identifying a location of a mobile device. The computer program product includes one or more computer readable storage media and program instructions stored on the one or more computer readable storage media. The program instructions include program instructions to receive location information from a mobile device, wherein the location information includes a sampling of location coordinates of the mobile device over a period of time. The program instructions further include program instructions to generate a path, using the sampling of location coordinates of the mobile device over the period of time. The program instructions further include program instructions to compare the path to geographic information system (GIS) data associated with the received location information. The program instructions further include program instructions to determine additional location information based on the path and the GIS data.

In yet another aspect, the present invention provides a computer system for identifying a location of a mobile device. The computer system includes one or more computer processors, one or more computer readable storage media, and program instructions stored on the computer readable storage media for execution by at least one of the one or more processors. The program instructions include program instructions to receive location information from a mobile device, wherein the location information includes a sampling of location coordinates of the mobile device over a period of time. The program instructions further include program instructions to generate a path, using the sampling of location coordinates of the mobile device over the period of time. The program instructions further include program instructions to compare the path to geographic information system (GIS) data associated with the received location information. The program instructions further include program instructions to determine additional location information based on the path and the GIS data.

In yet another aspect, the present invention provides a method for deploying a system for identifying a location of a mobile device, comprising: providing a computer infrastructure being operable to: receive location information from a mobile device, wherein the location information includes a sampling of location coordinates of the mobile device over a period of time; generate a path, using the sampling of location coordinates of the mobile device over the period of time; compare the path to geographic information system (GIS) data associated with the received location information; and determine additional location information based on the path and the GIS data.

BRIEF DESCRIPTION OF THE SEVERAL VIEWS OF THE DRAWINGS

FIG. 3 depicts an illustrative application of an embodiment of the present invention.

FIG. 4 depicts a second illustrative application of an embodiment of the present invention.

DETAILED DESCRIPTION

Figure 1:
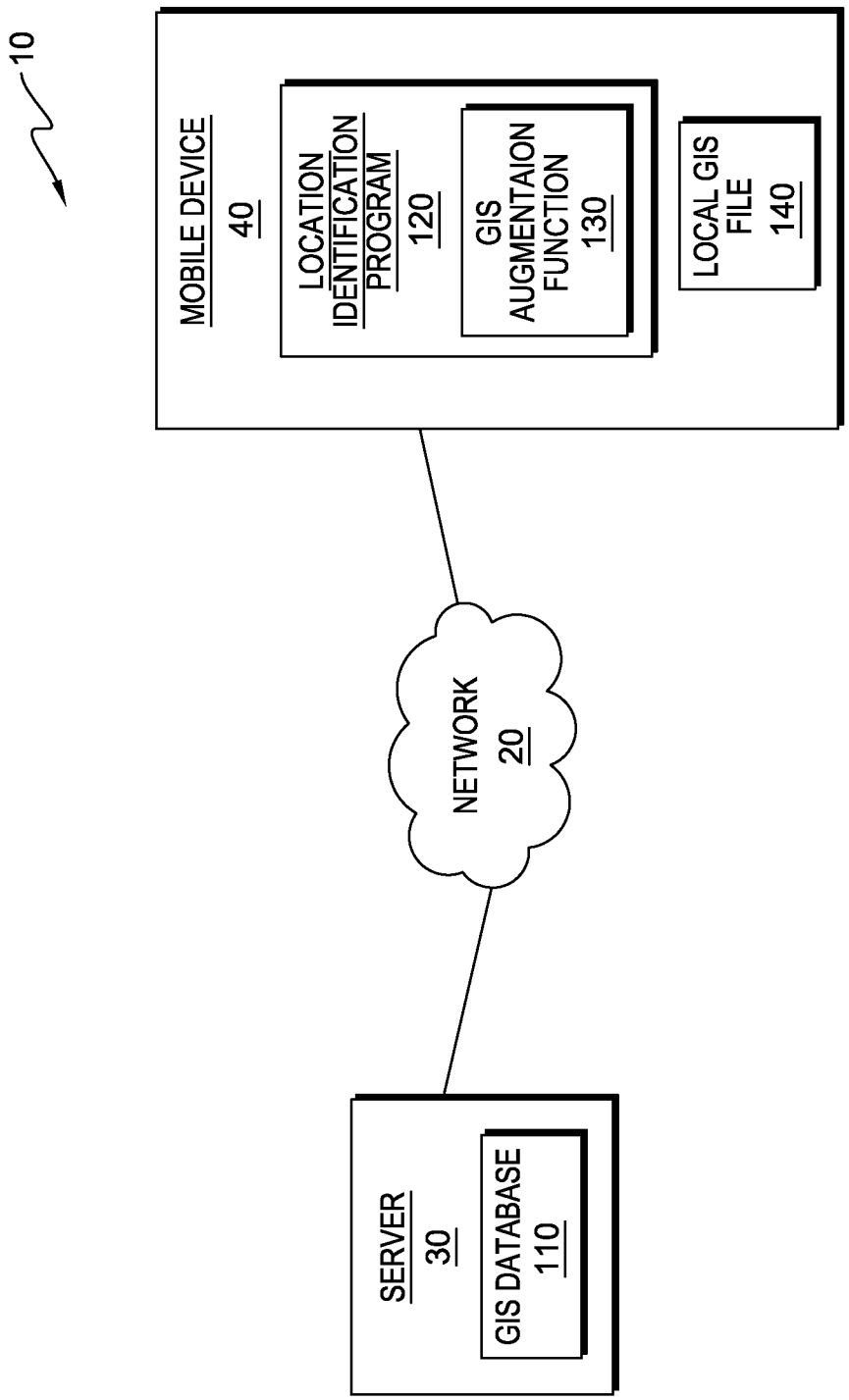
FIG. 1 depicts a diagram of a computing system, in accordance with one embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The present invention will now be described in detail with reference to the Figures.

FIG. 1 depicts a diagram of computing system 10, in accordance with one embodiment of the present invention. FIG. 1 provides only an illustration of one embodiment and does not imply any limitations with regard to the environments in which different embodiments may be implemented.

In the depicted embodiment, computing system 10 includes server 30 and mobile device 40 interconnected over network 20. Network 20 may be a local area network (LAN), a wide area network (WAN) such as the Internet, the public switched telephone network (PSTN), any combination thereof, or any combination of connections and protocols that will support communications between server 30 and mobile device 40, in accordance with embodiments of the invention. Network 20 may include wired, wireless, or fiber optic connections. Computing system 10 may include additional computing devices, servers, computers, mobile devices, or other devices not shown.

Server 30 may be a management server, a web server, or any other electronic device or computing system capable of receiving and sending data. In some embodiments, server 30 may be a laptop computer, tablet computer, netbook computer, personal computer (PC), a desktop computer, a personal digital assistant (PDA), a smart phone, or any programmable electronic device capable of communicating with mobile device 40 via network 20. In other embodiments, server 30 may represent a server computing system utilizing multiple computers as a server system, such as in a cloud computing environment. Server 30 contains GIS database 110. Server 30 may include components, as depicted and described in further detail with respect to FIG. 5.

GIS database 110 may be a repository that may be read by GIS augmentation function 130. GIS data and information, such as maps, floor plans, geographic information, location names, and other information may be stored to GIS database 110. In some embodiments, GIS augmentation function 130 may access and retrieve information from GIS database 110. In other embodiments, a program on server 30 (not shown) may push GIS database information updates to GIS augmentation function 130. The data stored to GIS database 110 may be changed or updated by data input by a user, such as a user with access to server 30. In one embodiment, GIS database 110 resides on server 30. In other embodiments, GIS database 110 may reside on another server, another computing device, or mobile device 40, provided that GIS database 110 is accessible to GIS augmentation function 130.

Mobile device 40 may be a laptop computer, netbook computer, tablet computer, personal digital assistant (PDA), GPS device, smart phone, or cell phone. In general, mobile device 40 may be any electronic device or computing system capable of sending and receiving data and location information, and communicating with server 30 over network 20. In some embodiments, mobile device 40 contains GPS receivers. In other embodiments, mobile device 40 contains radio-frequency identification (RFID) tags. In still other embodiments, mobile device 40 contains other sensors and/or receivers used by location identification program 120 and GIS augmentation function 130 to determine the location of mobile device 40. Mobile device 40 contains location identification program 120, GIS augmentation function 130, and local GIS file 140. Mobile device 40 may include components, as depicted and described in further detail with respect to FIG. 5.

Location identification program 120 is a generic location identification program or software application. For example, location identification program 120 may utilize GPS or triangulation techniques to determine the physical location of mobile device 40. In another example, location identification program 120 may utilize a series of RFID tag readers to locate a device with an RFID tag. In general, location identification program 120 may be any program or software application with location identification capabilities. In one embodiment, location identification program 120 includes GIS augmentation function 130.

GIS augmentation function 130 operates to enhance location identification program 120 to increase the accuracy or amount of location-related information obtained. GIS augmentation function 130 utilizes geographic information system (GIS) information, combined with a sampling of data collected by location identification program 120, to make determinations about the location of mobile device 40. GIS augmentation function 130 may receive a series of data points collected by location identification program 120. GIS augmentation function 130 may use the received data points to create a path, and compare that path to GIS information corresponding to the location of the received data points. For example, in a building, GIS information may include floor plans of the building. GIS augmentation function 130 may compare the created path against the floor plans of each floor and use that information to determine what floor of the building mobile device 40 is located.

Local GIS file 140 may be a repository that may be written and read by GIS augmentation function 130. In embodiments of the present invention, GIS augmentation function 130 may store GIS information to local GIS file 140 based on current or previous locations associated with mobile device 40. In some embodiments, GIS augmentation function 130 may retrieve or update GIS information from a GIS database, such as GIS database 110 on server 30. In one embodiment, local GIS file 140 resides on mobile device 40. In other embodiments, local GIS file 140 may reside on another server, another computing device, or server 30, provided that local DIS file 140 is accessible to GIS augmentation function 130.

Figure 2:
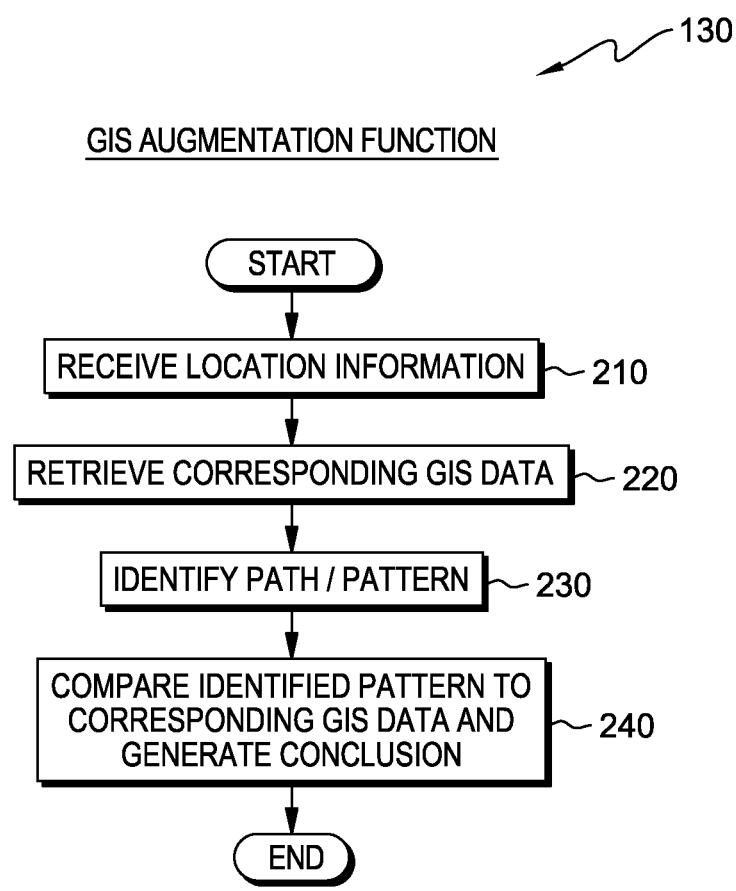
FIG. 2 depicts a flowchart of the steps of a geographic information system (GIS) augmentation function executing within the computing system of FIG. 1, in accordance with one embodiment of the present invention.

FIG. 2 depicts a flowchart of the steps of GIS augmentation function 130, a function of location identification program 120, executing within computing system 10 of FIG. 1, in accordance with an embodiment of the present invention. GIS augmentation function 130 operates to compare location data received from a mobile device, such as mobile device 40, to GIS data corresponding to the received location information. GIS augmentation function 130 also operates to identify a pattern or path created by the location data, and to generate a conclusion that provides additional information about the location of mobile device 40.

In step 210, GIS augmentation function 130 receives location information indicating the location of mobile device 40. GIS augmentation function 130 may receive the location information from location identification program 120. Location information may include any information capable of being used to identify the location of a device. For example, location information may include GPS coordinates, RFID tag information, location coordinates obtained through multilateration of radio signals between cellular towers, or other location identification information. Rather than receiving a single set of coordinates, GIS augmentation function 130 may cause location identification program 120 to use sampling techniques to retrieve a series of coordinates indicating location information of mobile device 40 over a period of time. In some embodiments GIS augmentation function 130 may store received location information along with time stamps indicating when coordinate was received.

In step 220, GIS augmentation function 130 retrieves corresponding GIS data. In some embodiments, GIS augmentation function 130 retrieves corresponding GIS data from an external source, such as GIS database 110 on server 30. In other embodiments, GIS data may be stored locally to a repository, such as local GIS file 140, on mobile device 40. GIS data may include maps, floor plans, blueprints, geographic information, or other information indicating information about a location. In some embodiments, GIS data may further include information indicating the types of activities expected to be performed by individuals located at the specified location. For example, GIS data may indicate that people are expected to be dancing at a dance club, bowling at a bowling alley, or remaining located in one spot for extended periods of time at a movie theatre. Corresponding GIS data may include GIS data associated with the location information received (see step 210), and/or GIS data associated with areas generally surrounding the location indicated by the received location information.

In step 230, GIS augmentation function 130 identifies a pattern or generates a path using multiple sampled data points from the received location information. Using the sampled location information received, GIS augmentation function 130 may generate a path or pattern indicating the location of mobile device 40 over a period of time (see FIG. 3 and FIG. 4, more specifically paths 310, 310', 410, and 410'). In one embodiment, the identified path or pattern may merely indicate the path traveled over a period of time. In another embodiment, the identified path or pattern may indicate a type of activity a user in possession of mobile device 40 is performing, such as dancing, bowling, riding in a car, playing golf, or some other activity that may be derived from location changes of mobile device 40.

In step 240, GIS augmentation function 130 compares the identified pattern to corresponding GIS data and uses that comparison to generate a conclusion. GIS augmentation function 130 may compare the identified pattern to corresponding GIS information or data in a variety of ways, dependent upon the type of GIS data retrieved. For example, if the GIS data includes a map or floor plan of a specific location, GIS augmentation function 130 may overlay the path/pattern generated using the received location information onto the map or floor plan indicated by the GIS data. Based on the GIS data retrieved, GIS augmentation function 130 may be able to generate conclusions relating to the building floor that mobile device 40 is located on, the type of activity a user in possession of mobile device 40 is participating in, the establishment where mobile device 40 is located, whether an offset calibration factor needs to be applied to adjust discrepancies between received location information and corresponding GIS data, or other determinations.

In one example application of the present invention, GIS augmentation function 130 will compare an identified path or pattern with GIS data indicating a nearby tall building or other potential signal blocking object. Alternatively, GIS augmentation function 130 may use historical information detailing a series of sampling patterns that indicate a tall building, or some other potential signal blocking object, is present at a specific location. In such a scenario, the location information received by GIS function 130 may appear to indicate that mobile device 40 follows a particular path and then jumps to a different location. Based on the GIS data indicating that a weak signal may have caused the jump, GIS augmentation function 130 may automatically correct the path, such that mobile device 40 continues along its original path (e.g., at a similar speed and/or direction), rather than jumping, until mobile device 40 is located at a location with no known signal blocking objects.

In another example application of the present invention, GIS augmentation function 130 may be able to determine the type of activity that a user in possession of mobile device 40 is performing and/or which establishment the user is located in. As previously discussed, GIS data may include the type of establishment located at a specified location (e.g., dance club, bowling alley, golf course, movie theatre, etc.). GIS data may also include types of activities that commonly occur at certain locations or establishments (e.g., dancing, golfing, jogging, etc.). In some embodiments, an external or local database (not depicted) may include movement patterns that form movement signatures indicative of the performance of various activities. Embodiments of GIS augmentation function 130 may compare the identified path or pattern (see step 230) to GIS data and/or a database containing movement patterns indicating signatures of various activities to determine the activity a user in possession of mobile device 40 is performing. In some embodiments, this information may be used to determine the establishment in which mobile device 40 is located. For example, in a multistory building there may be a movie theatre on one floor and a dance club on a different floor, wherein both the movie theatre and dance club are located on the same or similar coordinates (i.e., latitude and longitude coordinates). GIS augmentation function 130 may retrieve location information and generate a pattern indicating that mobile device 40 is located at coordinates associated with both the movie theatre and the dance club. However, GIS augmentation function 130 may compare the identified pattern to movement signatures associated with watching a movie and movement signatures associated with dancing. GIS augmentation function 130 may then determine, based on the comparison, whether mobile device 40 is located at the movie theatre or the dance club. For example, if GIS augmentation function 130 determines that the identified pattern matches a movement signature associated with dancing, GIS augmentation function 130 may determine that mobile device 40 is located at the dance club.

Additional example applications of the present invention are described in reference to FIGS. 3 and 4.

FIG. 3 depicts one possible application of an embodiment of the present invention. In application 300, GIS augmentation function 130 is used to augment location identification program 120 by potentially determining the floor of a building upon which mobile device 40 is located.

In application 300, GIS augmentation function 130 has received a series of location coordinates and GIS augmentation function 130 has used those location coordinates to generate coordinate path 310. Based on the received coordinates, GIS augmentation function 130 may retrieve GIS data from location file 140 or GIS database 110. In depicted application 300, the GIS data includes a series of floor plans for the building associated with the location coordinates used to generate coordinate path 310.

In the depicted example, there are two floor levels to the building. The floor plans for the building include first floor layout 305 and second floor layout 315. First floor layout 305 depicts room 307 and includes GIS data designating the presence of barrier 310. Barrier 310 may be any type of physical object that normally impedes the passage of traffic, such as a wall, bookshelf, or other object. Second floor layout 315 depicts room 317 and includes GIS data designating the presence of barriers 330 and 340. Barriers 330 and 340 may be any type of barrier, such as the types of barriers mentioned with regard to barrier 310.

As previously discussed, GIS augmentation function 130 will use received coordinates to generate a path or pattern, such as path 310, and compare that path or pattern against received GIS data. In the depicted example, coordinate path 310 is compared against first floor layout 305 and second floor layout 315 (depicted as coordinate path 310') to assist location identification program 120 by identifying potential possible floors upon which mobile device 40 may be located.

As depicted, coordinate path 310 passes through barrier 320 of room 307 on the first floor. By comparing coordinate path 310 to first floor layout 305, GIS augmentation function 130 may determine that mobile device 40 is not located on the first floor. GIS augmentation function 130 may determine that mobile device 40 is not located on the first floor because coordinate path passes through barrier 320, and barrier 320 should impede traffic. On the second floor, coordinate path 310 is represented by coordinate path 310'. Coordinate path 310' passes through room 317 without passing through any known barriers, such as depicted barriers 330 and 340. Based on this information, GIS augmentation function 130 may determine that mobile device 40 is located on the second floor.

In other examples, GIS augmentation function 130 may need to compare additional coordinates and create additional coordinate paths to determine the floor upon which mobile device 40 is located. For example, a building may have many floors, and it may take more coordinates, or a longer generated path to rule out the possibility of all but one floor. In such an example, GIS augmentation function 130 may narrow the field of potential floors and initiate a query with the user. Alternatively, GIS augmentation function 130 may combine application 300 with other potential applications of GIS augmentation function 130, such as comparing the movements of mobile device 40 to the establishments located on particular floors, to make a determination.

FIG. 4 depicts one possible application of an embodiment of the present invention. In application 400, GIS augmentation function 130 generates coordinate paths and uses GIS data to determine that an offset must be applied in order to have the coordinates received from location identification program 120 more accurately correspond with the GIS information data of the location.

In depicted example 400, GIS augmentation function 130 has received location information and GIS data corresponding to the received location information. Using the received information, GIS augmentation function 130 has generated coordinate path 420 and mapped the data according to GIS data received, which in depicted example 400 includes room 410. However, based on the received GIS information, GIS augmentation function 130 may determine that coordinate path 420 cannot pass through the walls of room 410. Responsive to the determination, GIS augmentation function 130 may generate an offset or calibration factor to apply to the received location information and/or the received GIS data.

After GIS augmentation function 130 applies the generated offset, the GIS data and generated coordinate path should appear to more accurately correspond to the location of mobile device 40. In depicted example 400, a generated offset or calibration factor is applied to GIS data associated with room 410 and/or location information used to generate coordinate path 420, such that coordinate path 420' does not pass through the walls of room 410'.

In some embodiments of the present invention, a single generated coordinate path, such as coordinate path 420 may be used to generate the offset. In other embodiments, historical data from mobile device 40 and/or other mobile devices may be used to generate an offset.

Figure 5:
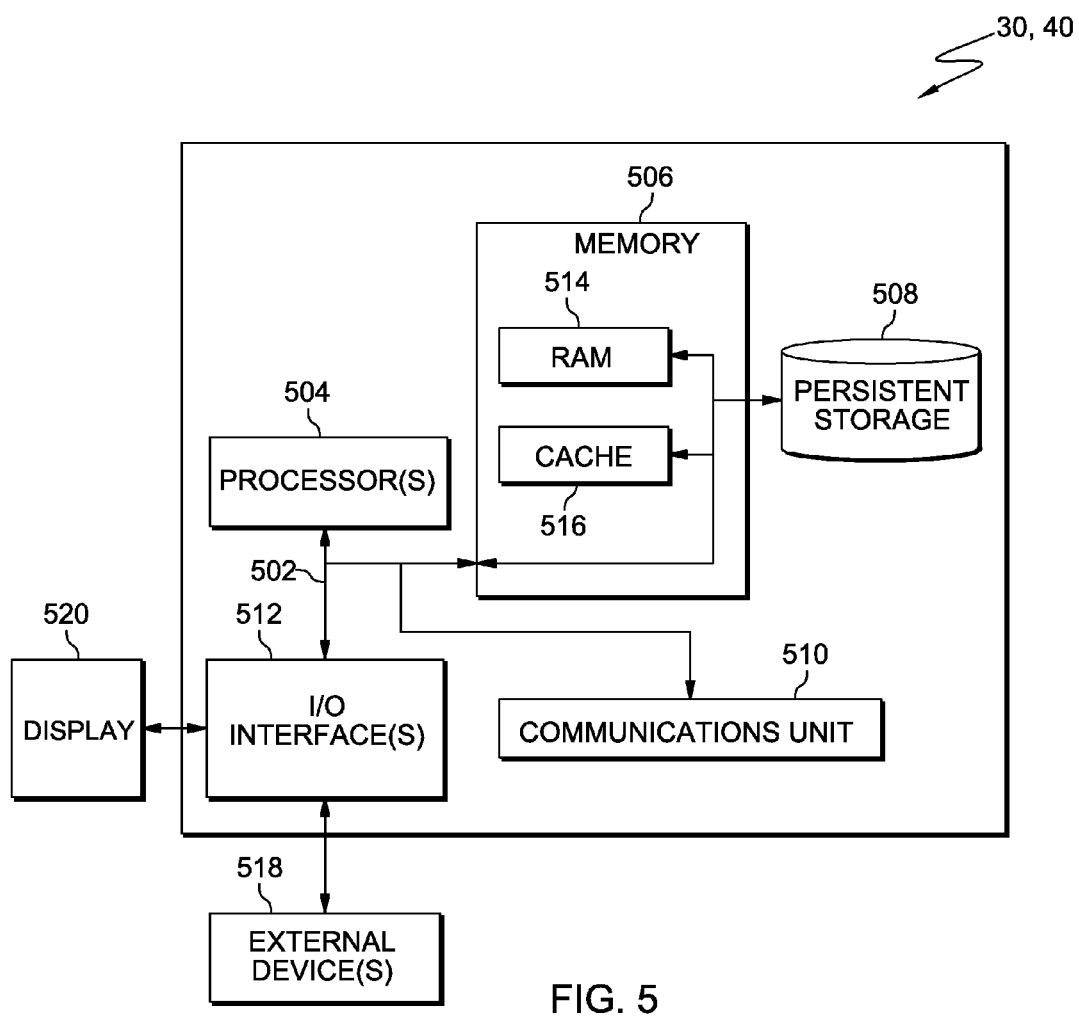
FIG. 5 depicts a block diagram of components of the server and the mobile device, in accordance with one embodiment of the present invention.

FIG. 5 depicts a block diagram of components of server 30 and mobile device 40 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server 30 and mobile device 40 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

GIS database 110 is stored in persistent storage 508 of server 30 for execution and/or access by one or more of the respective computer processors 504 of server 30 via one or more memories of memory 506 of server 30. Location identification program 120, GIS augmentation function 130, and local GIS file 140 are stored in persistent storage 508 of mobile device 40 for execution and/or access by one or more of the respective computer processors 504 of mobile device 40 via one or more memories of memory 506 of mobile device 40. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing computer readable program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. GIS database 110 may be downloaded to persistent storage 508 of server 30 through communications unit 510 of server 30. Location identification program 120, GIS augmentation function 130, and local GIS file 140 may be downloaded to persistent storage 508 of mobile device 40 through communications unit 510 of mobile device 40.

I/O interface(s) 512 allows for input and output of data with other devices that may be connected to server 30 and/or mobile device 40. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., GIS database 110, can be stored on such portable computer readable storage media and can be loaded onto persistent storage 508 of server 30 via I/O interface(s) 512 of server 30. Software and data used to practice embodiments of the present invention, e.g., location identification program 120, GIS augmentation function 130, and local GIS file 140, can be stored on such portable computer readable storage media and can be loaded onto persistent storage 508 of mobile device 40 via I/O interface(s) 512 of mobile device 40. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

In another embodiment, the invention provides a method that performs the process of the invention on a subscription, advertising, and/or fee basis. That is, a service provider, such as a Solution Integrator, could offer to provide mobile device location identification functionality. In this case, the service provider can create, maintain, support, etc., a computer infrastructure, such as computer system 10 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for mobile device location identification. In this case, a computer infrastructure, such as computer system 10 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 10 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying a location of a mobile device, the method comprising:
   receiving location information from a mobile device, wherein the location information includes a sampling of location coordinates of the mobile device over a period of time;
   generating, by one or more processors, a path, using the sampling of location coordinates of the mobile device over the period of time;
   comparing, by one or more processors, the path to geographic information system (GIS) data associated with the received location information;
   determining, by one or more processors, that the path passes through at least one physical barrier, as designated by the GIS data;
   generating, by one or more processors, a calibration factor, wherein the calibration factor adjusts the GIS data as compared to the path, such that the path does not pass through the physical barriers;
   determining, by one or more processors, whether the path matches a movement signature associated with the type of activity commonly performed by individuals at the location; and
   responsive to the path matching the movement signature, the one or more processors determining the location of the mobile device.

2. The method of claim 1, wherein the GIS data comprises information designating physical barriers.

3. The method of claim 1, wherein the GIS data comprises information designating a plurality of floor levels located at a set of coordinates, wherein information for each floor includes a designation of physical barriers on the floor.

4. The method of claim 3, wherein the step of determining, by the one or more processors, that the path passes through the at least one physical barrier, as designated by the GIS data comprises:
   determining, by one or more processors, whether the path passes through the at least one physical barrier as located on a first floor, as designated by the GIS data; and responsive to the path passing through the at least one physical barrier as located on the first floor, the one or more processors determining the mobile device is not located on the first floor.

5. The method of claim 1, wherein the GIS data comprises information indicating a type of activity commonly performed by individuals at a location.

6. A computer program product for identifying a location of a mobile device, the computer program product comprising:
   one or more non-transitory computer readable storage media and program instructions stored on the one or more non-transitory computer readable storage media, the program instructions comprising:
   program instructions to receive location information from a mobile device, wherein the location information includes a sampling of location coordinates of the mobile device over a period of time;
   program instructions to generate a path, using the sampling of location coordinates of the mobile device over the period of time;
   program instructions to compare the path to geographic information system (GIS) data associated with the received location information
   program instructions to determine that the path passes through at least one physical barrier, as designated by the GIS data;
   program instructions to generate a calibration factor, wherein the calibration factor adjusts the GIS data as compared to the path, such that the path does not pass through the physical barriers;
   program instructions to determine whether the path matches a movement signature associated with the type of activity commonly performed by individuals at the location; and
   program instructions to, responsive to the path matching the movement signature, determine the location of the mobile device.

7. The computer program product of claim 6, wherein the GIS data comprises information designating physical barriers.

8. The computer program product of claim 6, wherein the GIS data further comprises information designating a plurality of floor levels located at a set of coordinates, wherein information for each floor includes a designation of physical barriers on the floor.

9. The computer program product of claim 8, wherein program instructions to determine that the path passes through at least one physical barrier, as designated by the GIS data comprise:
   program instructions to determine whether the path passes through the at least one physical barrier as located on a first floor, as designated by the GIS data; and program instructions to, responsive to the path passing through the at least one physical barrier as located on the first floor, determine the mobile device is not located on the first floor.

10. A computer system for identifying a location of a mobile device, the computer system comprising:
    one or more computer processors, one or more computer readable storage media, and program instructions stored on the computer readable storage media for execution by at least one of the one or more processors, the program instructions comprising:
    program instructions to receive location information from a mobile device, wherein the location information includes a sampling of location coordinates of the mobile device over a period of time;

program instructions to generate a path, using the sampling of location coordinates of the mobile device over the period of time;

program instructions to compare the path to geographic information system (GIS) data associated with the received location information;

program instructions to determine that the path passes through at least one physical barrier, as designated by the GIS data; and program instructions to generate a calibration factor, wherein the calibration factor adjusts the GIS data as compared to the path, such that the path does not pass through the physical barriers;

program instructions to determine whether the path matches a movement signature associated with a type of activity commonly performed by individuals at the location; and program instructions to responsive to the path matching the movement signature, determine the location of the mobile device.

11. The computer system of claim 10, wherein the GIS data comprises information designating physical barriers.

12. The computer system of claim 10, wherein the GIS data comprises information designating a plurality of floor levels located at a set of coordinates, wherein information for each floor includes a designation of physical barriers on the floor.

13. The computer system of claim 12, wherein program instructions to determine that the path passes through at least one physical barrier, as designated by the GIS data comprise:

program instructions to determine whether the path passes through the at least one physical barrier as located on a first floor, as designated by the GIS data; and program instructions to, responsive to the path passing through the at least one physical barrier as located on the first floor, determine the mobile device is not located on the first floor.

14. The computer system of claim 10, wherein the GIS data comprises information indicating a type of activity commonly performed by individuals at a location.

* * * * *